(12) United States Patent
Schmieder

(10) Patent No.: US 9,324,981 B2
(45) Date of Patent: Apr. 26, 2016

(54) CELL FRAME FOR EXTENDED RANGE ELECTRIC VEHICLE BATTERY MODULE

(75) Inventor: Ulrich Schmieder, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 1129 days.

(21) Appl. No.: 13/354,463

(22) Filed: Jan. 20, 2012

(65) Prior Publication Data

US 2013/0189554 A1    Jul. 25, 2013

(51) Int. Cl.
*H01M 2/02* (2006.01)
*H01M 2/10* (2006.01)
*H01M 10/04* (2006.01)

(52) U.S. Cl.
CPC .......... *H01M 2/1077* (2013.01); *H01M 2/1094* (2013.01); *H01M 10/0481* (2013.01); *H01M 2220/20* (2013.01)

(58) Field of Classification Search
CPC ....................................................... H01M 2/02
See application file for complete search history.

(56) References Cited

U.S. PATENT DOCUMENTS

2003/0027043 A1\* 2/2003 Benson et al. ................. 429/178
2011/0311852 A1\* 12/2011 Mineya ........................... 429/94

\* cited by examiner

*Primary Examiner* — Jacob Marks
(74) *Attorney, Agent, or Firm* — Fraser Clemens Martin & Miller LLC; James D. Miller

(57) ABSTRACT

A foldable frame for a battery cell assembly includes a one-piece main body. The main body has a first section, a second section, and a third section. The first section is coupled to each of a second section and a third section with living hinges. The first section is configured to receive a first battery cell. The second section is configured to receive an expansion unit and a second battery cell. The second section folds over the first battery cell. The third section is configured to fold over the second battery cell, thereby securing each of the first battery cell, the expansion unit, and the second battery cell within the foldable frame.

15 Claims, 3 Drawing Sheets

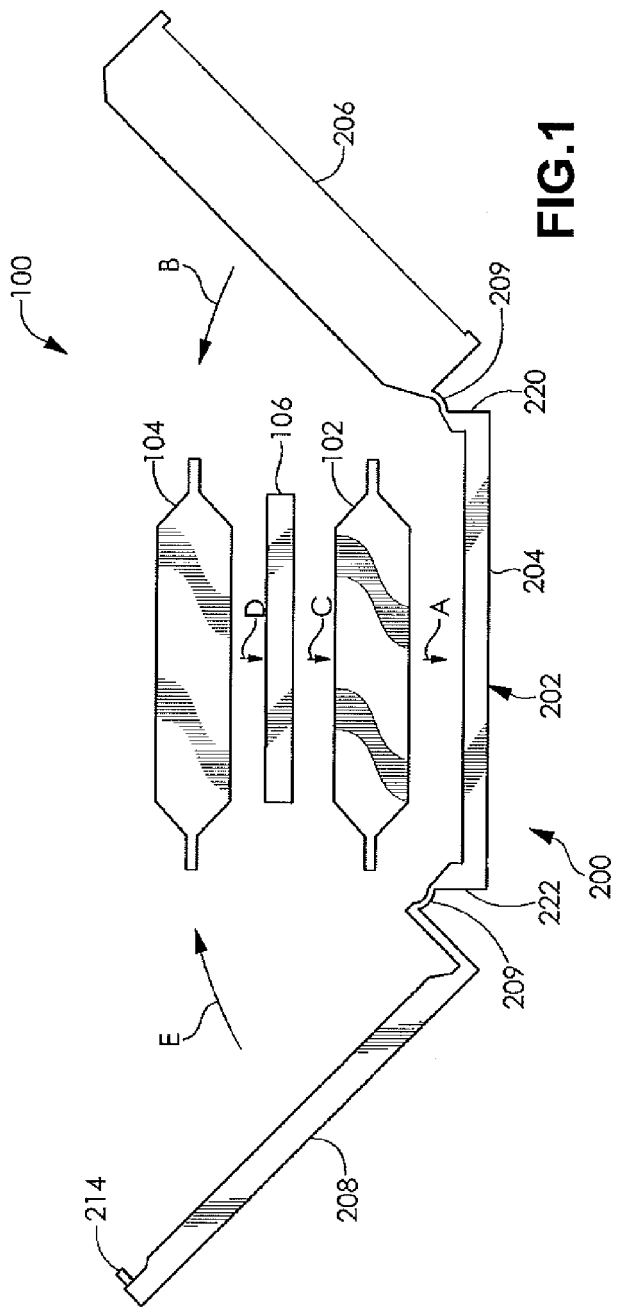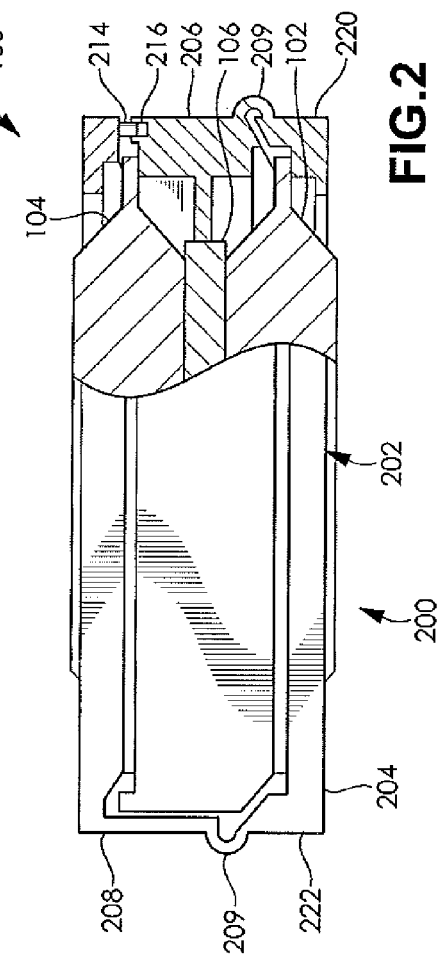

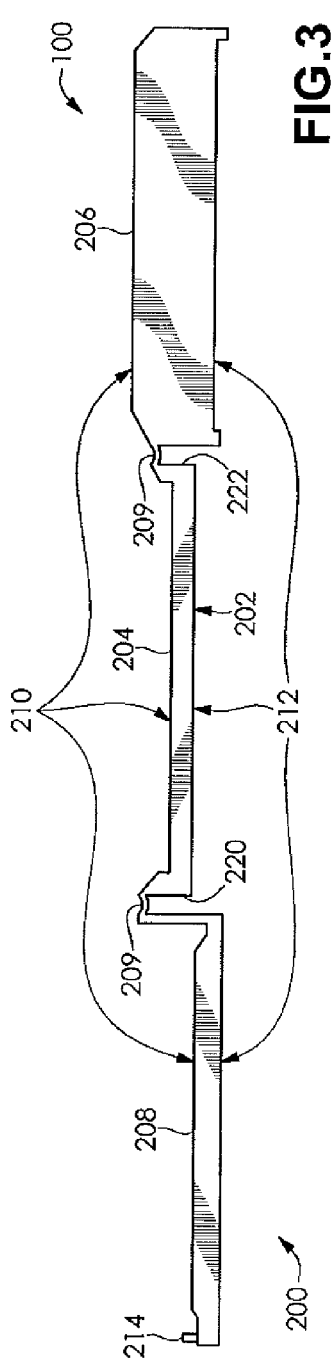
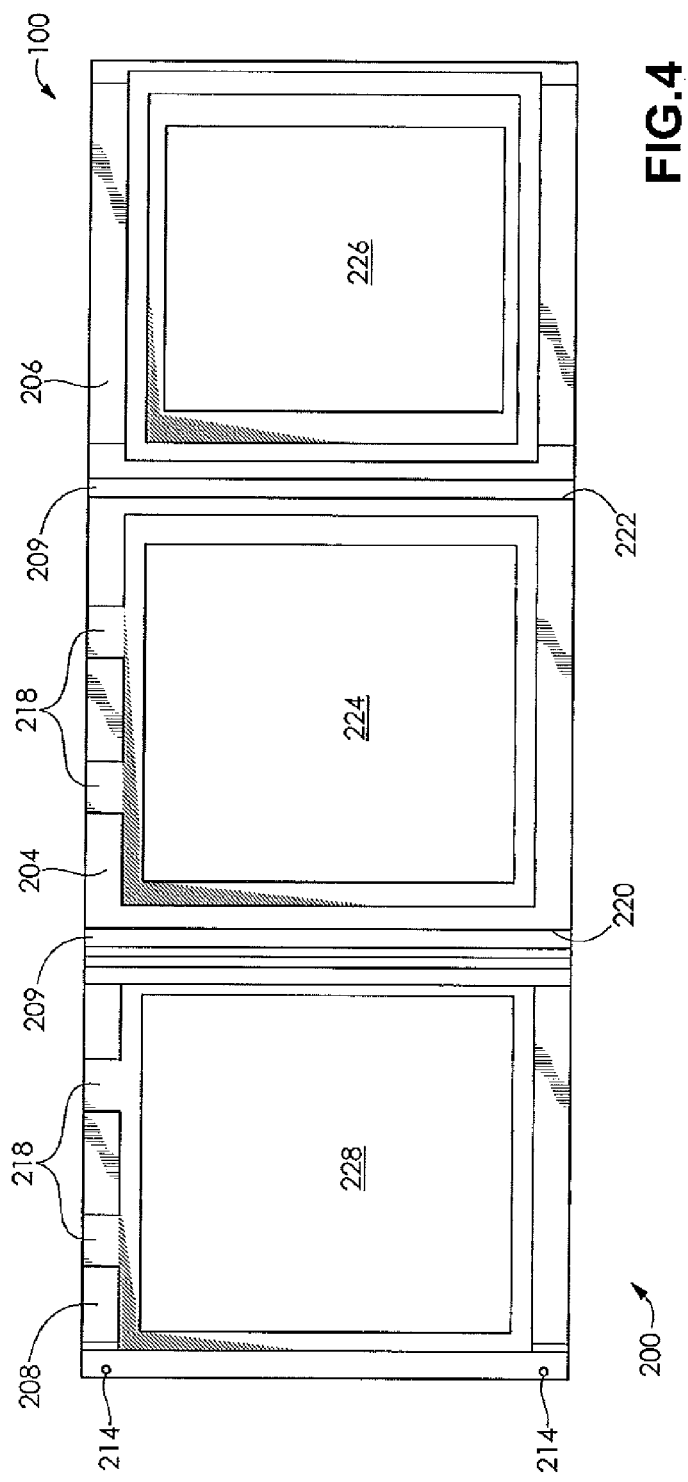

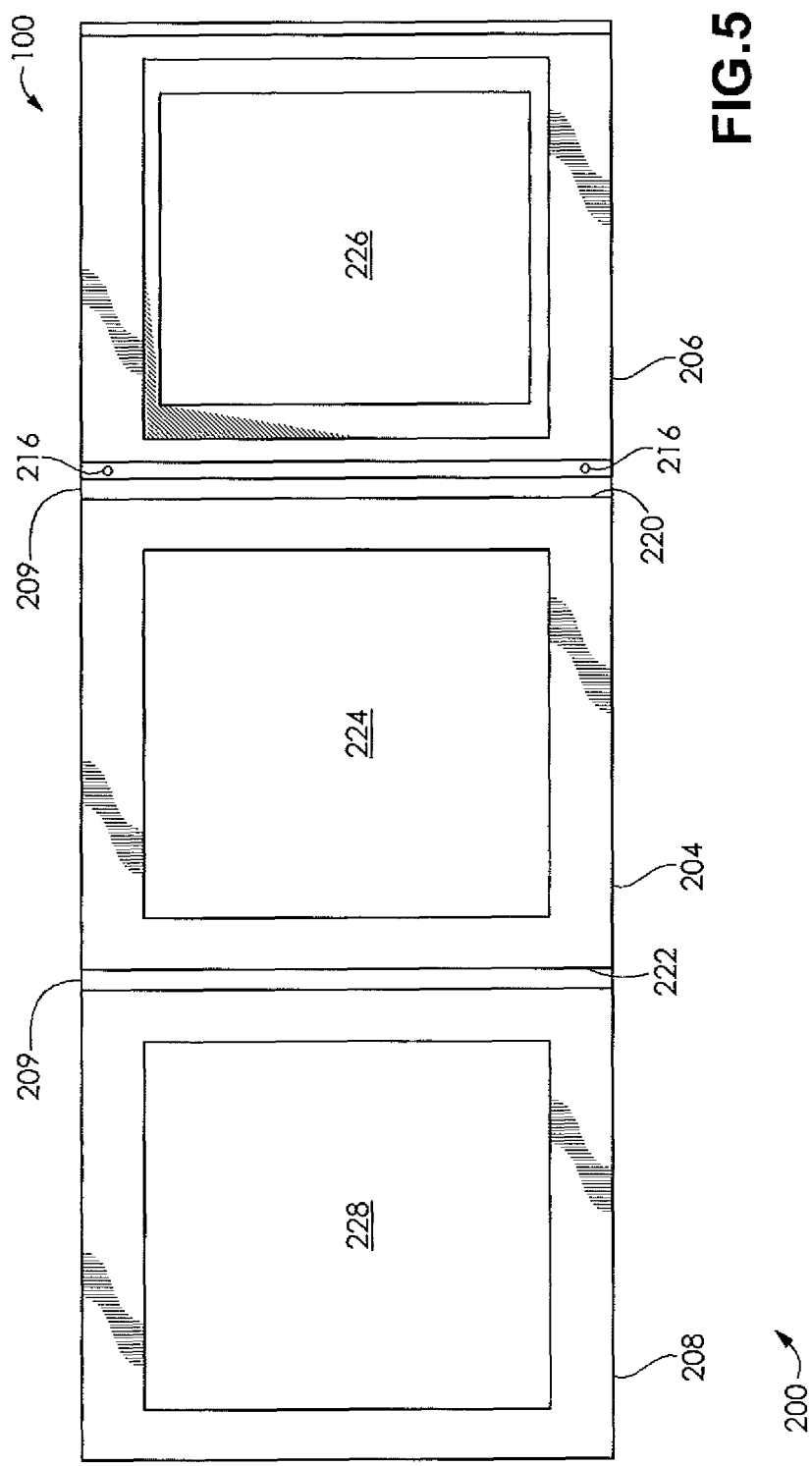

CELL FRAME FOR EXTENDED RANGE ELECTRIC VEHICLE BATTERY MODULE

FIELD OF THE INVENTION

The present disclosure relates to a battery and more particularly to a frame for battery cells of the battery.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery to provide an amount of power sufficient to operate electric vehicles.

Typical prismatic battery cells have a pair of plastic coated metal layers fused around a periphery of the battery cell in order to seal the battery cell components. The sealing of the battery cells generally begins with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. Before finalizing the sealing, the cell is evacuated. The battery cell for incorporation in the battery is thereby provided.

Battery cells such as lithium-ion battery cells are known to expand and contract during operation and as a result of a charge cycle when recharging. Repeated cycles of expansion and contraction can impact the long term operation of lithium-ion batteries. It has been known to insert polymeric foam expansion units between individual battery cells of the battery in order to accommodate the expansion and contraction of the battery cells in operation, minimize an impact of the expansion and contraction on durability of the battery, and compensate for any manufacturing and assembly tolerances. Cell frames have also been employed to hold together the battery cells and the expansion units. However, known cell frames have undesirably consisted of individual parts that are manufactured and handled separately prior to assembly.

There is a continuing need for a means for mechanically holding and protecting battery cells and expansion units, which provides electrical insulation of the battery cells and permits an installation of the battery cells and expansion units into a battery as a battery cell assembly. Desirably, the means is a one-piece monolithic component that minimizes a complexity of manufacturing, handling, and assembling of the battery.

SUMMARY OF THE INVENTION

In concordance with the instant disclosure, a means for mechanically holding and protecting battery cells and expansion units, which provides electrical insulation of the battery cells and permits an installation of the battery cells and expansion units into a battery as a battery cell assembly, and which is a one-piece monolithic component that minimizes a complexity of manufacturing, handling, and assembling of the battery, is surprisingly discovered.

In one embodiment, a foldable frame for a battery cell assembly includes a one-piece main body having a first section coupled to each of a second section and a third section with living hinges. The first section is configured to receive a first battery cell. The second section is configured to fold over the first battery cell and receive an expansion unit and a second battery cell. The third section is configured to fold over the second battery cell and close the frame.

In another embodiment, a battery cell assembly includes a first battery cell and a second battery cell. An expansion unit is disposed between the first battery cell and the second battery cell. A foldable frame includes a one-piece main body having a first section coupled to each of a second section and a third section with living hinges, The first section receives the first battery cell, the second section receives the expansion unit and the second battery cell and folds over the first battery cell. The third section folds over the second battery cell.

In a further embodiment, a method for manufacturing the battery cell assembly having the foldable frame includes the steps of; A) disposing the first battery cell in the first section; B) folding the second section over the first battery cell; C) disposing the expansion unit in the second section; D) disposing the second battery cell on the expansion unit; and E) folding the third section over the second battery cell. The third section cooperates with the second section to secure each of the first battery cell, the expansion unit, and the second battery cell within the foldable frame and form the battery cell.

DRAWINGS

The above, as well as other advantages of the present disclosure, will become readily apparent to those skilled in the art from the following detailed description, particularly when considered in the light of the drawings described herein.

FIG. 1 is an exploded side elevational view of a battery cell assembly according to one embodiment of the disclosure, illustrating a stepwise assembly of the battery cell using a cell frame;

FIG. 2 is a fragmentary side elevational view of the battery cell assembly depicted in FIG. 1, the battery cell assembly shown assembled with a portion shown in cross-section to illustrate an interior of the battery cell assembly;

FIG. 3 is a side elevational view of the cell frame used in the battery cell assembly depicted in FIGS. 1-2;

FIG. 4 is a top plan view of the cell frame depicted in FIG. 3; and

FIG. 5 is a bottom plan view of the cell frame depicted in FIG. 3.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, are not necessary or critical.

With reference to FIGS. 1 and 2, a battery cell assembly 100 for a battery (not shown) is shown. The battery cell assembly 100 has a pair of battery cells 102, 104, including a first battery cell 102 and a second battery cell 104, with an expansion unit 106 disposed therebetween. The battery cells 102, 104 are configured to generate power from an electrochemical reaction. The battery cells may each be a prismatic battery cell, for example, as described and shown in Assignee's co-pending U.S. patent application Ser. No. 13/035,236 to Heise. As a nonlimiting example, each of the battery cells 102, 104 is a prismatic lithium ion (Li-ion) pouch cell having electrical tabs for placing the battery cells 102, 104 in electrical communication with a load such as an electric vehicle. The expansion unit may be a polymeric or foam layer that permits an expansion and contraction of the battery cells 102, 104 during operation. It should be appreciated that other types of the battery cells, employing a different structure and electrochemistry, and other types of expansion units, may also be used within the scope of the present invention.

The battery cell assembly 100 of the present disclosure includes a foldable frame 200. The foldable frame 200 includes a one-piece main body 202. The one-piece main body 202 is formed from a dielectric material. In particular embodiments, the one-piece main body 202 is formed from a cast plastic and is electrically insulating. Other dielectric materials suitable for forming the one-piece main body 202 may also be used, as desired.

The one-piece main body 202 has a first section 204 coupled to each of a second section 206 and a third section 208 with a plurality of living hinges 209. Each of the living hinges 209 is a thin flexible hinge made from plastic that joins one of the second section 206 and the third section 208 to the first section 204. The living hinges 209 permit a folding of the second section 206 and the third section 208 over the first section 204 when thinned portions of the plastic of the living hinges 209 bends to allow movement. In an illustrative embodiment, the living hinges 209 are formed as part of the one-piece main body 202, for example, from cast plastic.

The first section 204 is configured to receive the first battery cell 102. The second section is configured to receive the expansion unit 106 and the second battery cell 104. The second section folds over the first battery cell 102, and the third section 208 folds over the second battery cell 104, upon assembly of the battery cell assembly 100 as shown in FIG. 2.

Referring now to FIGS. 3-5, the one-piece main body 202 when unfolded has a top side 210 and a bottom side 212. The top side 210 of the third section 208 may have at least one protuberance 214. The bottom side 212 of the second section 206 may have at least one hole 216. The at least one hole 216 is configured to receive the at least one protuberance 214 when the frame 200 is folded, as depicted in FIG. 2. In a particular embodiment, the at least one hole 216 is configured to friction fit or snap fit with the at least one protuberance 214 when the frame 200 is folded. Other means for securing the foldable frame 200 in the folded position may also be employed within the scope of the present disclosure.

As illustrated in FIG. 4, each of the first section 204 and the third section 208 may have at least one slot 218 formed therein. It should be appreciated that the at least one slot 218 is configured to receive electrical tabs (not shown) of the first battery cell 102 and the second battery cell 104, for the purposes of electrically connecting the battery cell assembly 100 with other battery cells 100 in a battery cell stack and, subsequently, to a load.

In certain embodiments, the first section 204 of the one-piece main body 202 has a first side 220 and a second side 222. The second section 206 of the one-piece main body 202 may be coupled to the first side 220 of the first section 204 with the living hinges 209. The third section 208 may also be coupled to the second side 222 of the first section 204 with the living hinges 209.

In one non limiting example, the at least one hole 216 maybe formed in the bottom side 212 of the second section 206 of the one-piece main body 202 proximal the first side 220 of the first section 204. Likewise, the at least one protuberance 214 for cooperation with the at least one hole 216 may be formed on the top side 210 of the third section 208 of the one-piece main body 202 distal the second side 222 of the first section 204, so that the at least one protuberance 214 may cooperate with the at least one hole 216 upon the folding of the frame 200.

In further embodiments, each of the first section 204, the second section 206, and the third section 208 has a central opening 224, 226, 228. Advantageously, the central openings 224, 226, 228 together permit both the first battery cell 102 and the second battery cell 104 to contact the expansion unit 106 upon folding of the frame 200 and assembly of the battery cell assembly 100.

With renewed reference to FIG. 1, the present disclosure includes a method for manufacturing the battery cell assembly 100. The method includes a step A) of disposing the first battery cell 102 in the first section 204 of the frame 200. In a step B), the second section 206 of the frame 200 is folded over the first battery cell 102. The expansion unit 106 is then disposed in the section 206 of the frame 200 in a step C). In step D), the second battery cell 104 is disposed on the expansion unit 1-6. The battery cell assembly 100 is completed when, in a step E), the third section 208 of the frame 200 is folded over the second battery cell 104. It should be appreciated that, when assembled, each of the first battery cell 102 and the second battery cell 104 abuts the expansion unit 106. The folding of the third section 208 of the frame 200 over the second battery cell 104 secures each of the first battery cell 102, the second battery cell 104 and the expansion unit 106 within the foldable frame 200.

The method may further include a step of disposing the protuberance 214 in the hole 216 when folding the third section 208 over the second battery cell 104. In particular, where the protuberance 214 friction fits or snap fits within the hole 216, the first battery cell 102, the expansion unit 106, and the second battery cell 104 are secured within the foldable frame 200 to form the battery cell assembly 100.

Upon assembly of a plurality of the battery cell assemblies 100, the battery cell assemblies 100 may be installed into a heat exchanger to create a module, i.e., a compact independent assembly containing a number of the battery cell assemblies 100, the heat exchanger, related electronics, etc. that may then be electrically connected as a battery to provide power to an electric vehicle.

Advantageously, the battery cell assembly 100 having the foldable frame 200 of the present disclosure provides for easy part handling, without need for pre-assembly of parts and additional tooling. The battery cell assembly 100 and foldable frame 200 also do not require additional parts like fixtures and joints. In particular, the living hinges 209 assure a clear assembly process and militate against missing of parts and assembly sequence steps. Due to the known durability of living hinges 209, repeated de- and re-assembling of the battery cell assembly 100 for purposes of repair, service and recycling are also facilitated by the battery cell assembly 100 and foldable frame 200.

While certain representative embodiments and details have been shown for purposes of illustrating the invention, it will be apparent to those skilled in the art that various changes may be made without departing from the scope of the disclosure, which is further described in the following appended claims.

What is claimed is:

1. A foldable frame for a battery cell assembly, comprising:
   a one-piece main body having a first section coupled to
      each of a second section with a first living hinge and a
      third section with a second living hinge, the first section
      configured to receive a first battery cell, the second section configured to receive an expansion unit and a second battery cell and fold over the first battery cell, and the third section configured to fold over the second battery cell, wherein the one-piece main body has a top side and a bottom side when unfolded, the bottom side of the second section of the one-piece main body having a hole configured to receive a protuberance formed on the top side of the third section of the one-piece main body.

2. The foldable frame of claim 1, wherein the hole is configured to snap fit with the at least one protuberance when the frame is folded.

3. The foldable frame of claim 1, wherein each of the first section and the third section has at least one slot formed therein and is configured to receive electrical tabs of the first battery cell and the second battery cell.

4. The foldable frame of claim 1, wherein the first section has a first side and a second side, the second section coupled to the first side of the first section with the first living hinge, and the third section coupled to the second side of the first section with the second living hinge.

5. The foldable frame of claim 1, wherein the one-piece main body is formed from a cast plastic.

6. The foldable frame of claim 1, wherein each of the first section, the second section, and the third section has a central opening, which together permit both the first battery cell and the second battery cell to contact the expansion unit.

7. A method for manufacturing a battery cell assembly having a foldable frame, the foldable frame including a one-piece main body having a first section coupled to each of a second section and a third section with living hinges, the first section configured to receive a first battery cell, the second section configured to receive an expansion unit and a second battery cell and fold over the first battery cell, and the third section configured to fold over the second battery cell, wherein the one-piece main body has a top side and a bottom side when unfolded, the bottom side of the second section having a hole configured to receive a protuberance formed on the top side of the third section of the one-piece main body, the method comprising the steps of:

A) disposing the first battery cell in the first section;
B) folding the second section over the first battery cell;
C) disposing the expansion unit in the second section;
D) disposing the second battery cell on the expansion unit;
E) folding the third section over the second battery cell, the third section cooperating with the second section to secure each of the first battery cell, the expansion unit, and the second battery cell within the foldable frame, and
F) disposing the protuberance in the hole when folding the third section over the second battery cell to secure the first battery cell, the expansion unit, and the second battery cell within the foldable frame.

8. A foldable frame for a battery cell assembly, comprising:
a one-piece main body having a first section with a first side and a second side, the first side of the first section coupled to a second section with a first living hinge and the second side coupled to a third section with a second living hinge, the first section configured to receive a first battery cell, the second section configured to receive an expansion unit and a second battery cell and fold over the first battery cell, and the third section configured to fold over the second battery cell.

9. The foldable frame assembly of claim 8, wherein the one-piece main body has a top side and a bottom side when unfolded.

10. The foldable frame of claim 8, wherein a bottom side of the second section of the one-piece main body has at least one hole and a top side of the third section of the one-piece main body has at least one protuberance.

11. The foldable frame of claim 10, wherein the at least one hole receives the at least one protuberance when the frame is folded.

12. The foldable frame of claim 11, wherein the at least one hole snap fits with the at least one protuberance.

13. The foldable frame of claim 8, wherein each of the first section and the third section has at least one slot formed therein to receive electrical tabs of the first battery cell and the second battery cell.

14. The battery cell assembly of claim 8, wherein the one-piece main body is formed from a cast plastic.

15. The battery cell assembly of claim 8, wherein each of the first section, the second section, and the third section has a central opening, the central opening of the second section permitting the first battery cell and the second battery cell to contact the expansion unit.

* * * * *